(12) United States Patent
van Sinderen et al.

(10) Patent No.: US 11,557,910 B2
(45) Date of Patent: Jan. 17, 2023

(54) POWER MANAGEMENT FOR APPLICATIONS HAVING DUTY-CYCLED HIGH PEAK SUPPLY CURRENTS

(71) Applicant: NXP B.V., Eindhoven (NL)

(72) Inventors: Jan van Sinderen, Liempde (NL); Salvatore Drago, Eindoven (NL); Gerard Villar Pique, Eindoven (NL); Esa Petri Tarvainen, Graz (AT); Wolfgang Hoess, Graz (AT)

(73) Assignee: NXP B.V., Eindhoven (NL)

( * ) Notice: Subject to any disclaimer, the term of this patent is extended or adjusted under 35 U.S.C. 154(b) by 120 days.

(21) Appl. No.: 17/131,041

(22) Filed: Dec. 22, 2020

(65) Prior Publication Data

US 2022/0200308 A1 Jun. 23, 2022

(51) Int. Cl.
*H02J 7/00* (2006.01)

(52) U.S. Cl.
CPC ........ *H02J 7/00712* (2020.01); *H02J 7/0029* (2013.01); *H02J 7/0063* (2013.01)

(58) Field of Classification Search
CPC ........................................................ H02J 7/00
See application file for complete search history.

(56) References Cited

U.S. PATENT DOCUMENTS

| 6,387,553 | B1 * | 5/2002 | Putt | H01M 4/36 |
| | | | | 429/3 |
| 6,504,422 | B1 * | 1/2003 | Rader | H02M 3/07 |
| | | | | 327/536 |
| 10,003,208 | B2 | 6/2018 | Pique et al. | |
| 2008/0129219 | A1 | 6/2008 | Smith et al. | |
| 2013/0082661 | A1 | 4/2013 | Bohan, Jr. et al. | |
| 2018/0024579 | A1 | 1/2018 | Kamp et al. | |

FOREIGN PATENT DOCUMENTS

EP    2582004 A1    4/2013

OTHER PUBLICATIONS

Charlon et al., "Ultra High-Compliance CMOS Current Mirrors for Low Voltage Charge Pumps and References," IEEE, 2004, pp. 227-230; 4 pages.
Florian Feckl, "Efficient Super-Capacitor Charging with TPS62740," Texas Instruments Application Report SLVA678, Dec. 2014; 11 pages.
Learnvst et al., "Charging capacitor bank with current limiting circuit," Electrical Engineering Stack Exchange, Sep. 4, 2012; 11 pages.
NXP B.V., "NCJ29D5AHN VBOND Ultra Wideband Transceiver," Preliminary Data Sheet VBOND_DS_0.12,, Rev. 0.12, Dec. 17, 2019; 44 pages.

* cited by examiner

*Primary Examiner* — Robert Grant

(57) ABSTRACT

A method for power management for applications having duty-cycled high peak supply currents includes charging a buffer capacitor with a first current supplied by a battery, wherein the first current is limited by a current limiter. A load is supplied with a second current supplied by the buffer capacitor, wherein the second current comprises a pulsed current. The current limiter is controlled with at least one of a plurality of sensor inputs to limit a capacity degradation of the battery.

17 Claims, 9 Drawing Sheets

POWER MANAGEMENT FOR APPLICATIONS HAVING DUTY-CYCLED HIGH PEAK SUPPLY CURRENTS

FIELD

This disclosure relates generally to power management of battery powered applications, and more specifically to power management of applications with duty-cycled high peak supply currents.

BACKGROUND

Many applications require a relatively low average supply current provided by a battery, but periodically require a high peak current. These applications are often duty-cycled, with a relatively long inactive period (e.g., sleep, stand-by or off time). Typically, a battery can easily sustain the average current for a long period of time, but the battery life, or capacity, is degraded significantly when peak currents are required to be supplied.

Traditional solutions to the problem of battery degradation due to pulsed loads include adding a large capacitor in parallel with the battery. However, this large capacitor is costly, can have mechanical reliability issues due to its size, and also can contribute significantly to leakage current thus further reducing the effective battery life. In addition, use of a lower leakage capacitor in parallel with the battery further increases the cost beyond that incurred with a standard capacitor having higher leakage current.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
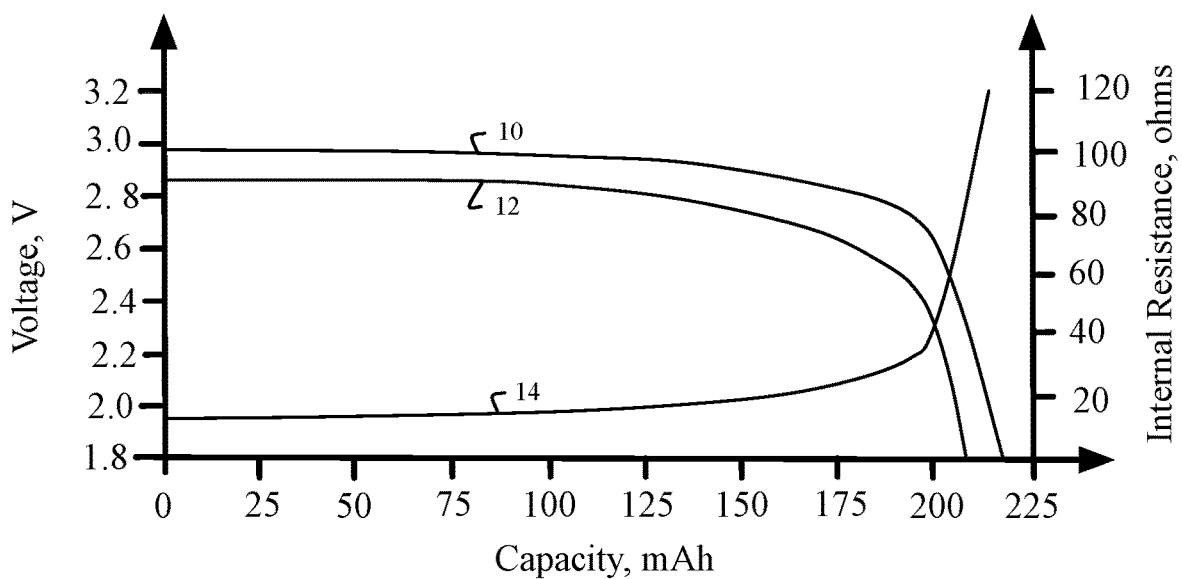
FIG. 1 is a graphical view of a discharge characteristic of a lithium coin cell with a continuous load.
Figure 2:
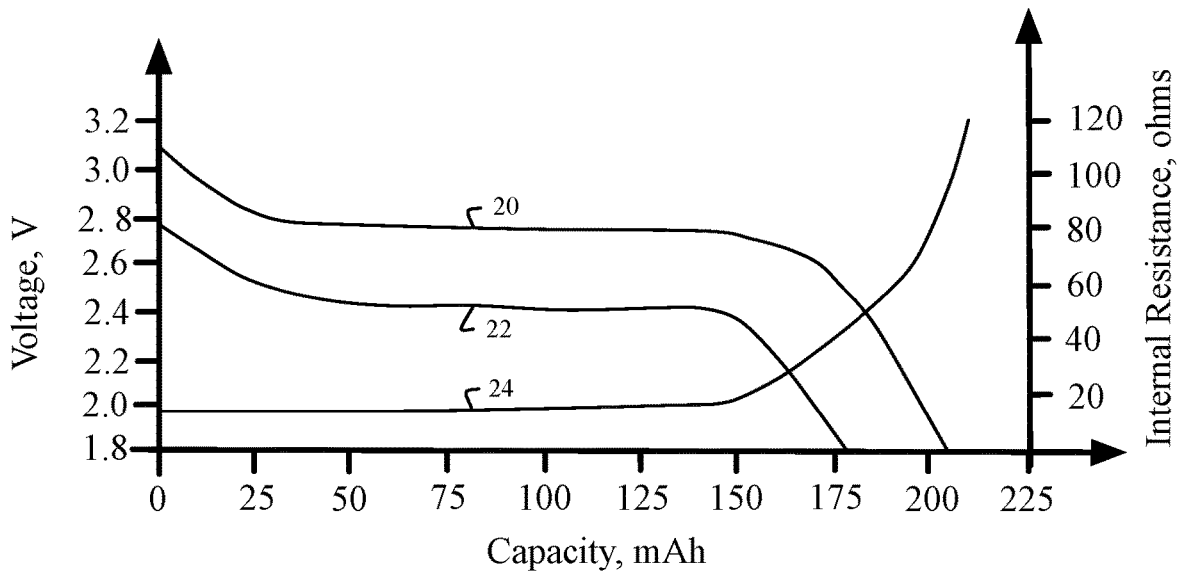
FIG. 2 is a graphical view of a discharge characteristic of a lithium coin cell with a pulsed load.

Embodiments described herein provide for power management of battery-based systems for applications having duty-cycled high peak supply currents. Specifically, current drawn from a battery (e.g., a coin cell battery), is limited to prevent premature degradation of the battery current capacity, while peak loads are supplied from a buffer capacitor. The buffer capacitor includes undesirable limitations with regards to leakage, size and the like, which are minimized with a current limiting circuit while optimizing battery capacity. The FIG. 1 and FIG. 2 show the discharge characteristics of a typical Lithium coin cell battery under a continuous and pulsed current load. In FIG. 1, a Closed Circuit Voltage (CCV) 10 is maintained relatively close to the initial 3.0V voltage over a significant range of battery capacity (expressed in mA-hours). Specifically, the CCV 10 represents a continuous or background current of 0.19 mA at 2.9V, 21 degrees Celsius through 15K ohms. A relatively low pulsed current results in a CCV 12, also over the significant range of battery capacity. Specifically, the CCV 12 represents a pulsed current of 6.8 mA at 2.7V, 21 degrees Celsius through 400 ohms, with a 2 second pulse applied 12 times per day. An internal resistance 14 is also maintained at a relatively low value over the significant range of battery capacity.

In FIG. 2, a Closed Circuit Voltage (CCV) 20 drops significantly from the initial 3.0V voltage due to premature battery degradation resulting from the application of a high peak current pulse load. Specifically, the CCV 20 represents a continuous or background current close to 0 mA at 21 degrees Celsius. A relatively high pulsed current results in a CCV 22, with a significant reduction in CCV due to the battery degradation. Specifically, the CCV 22 represents a pulsed current of 23 mA at 2.7V, 21 degrees Celsius through 120 ohms, with a 1 millisecond pulse applied every 15 milliseconds. An internal resistance 24 increases earlier than the internal resistance 14 of FIG. 1 due to the premature battery degradation.

Figure 3:
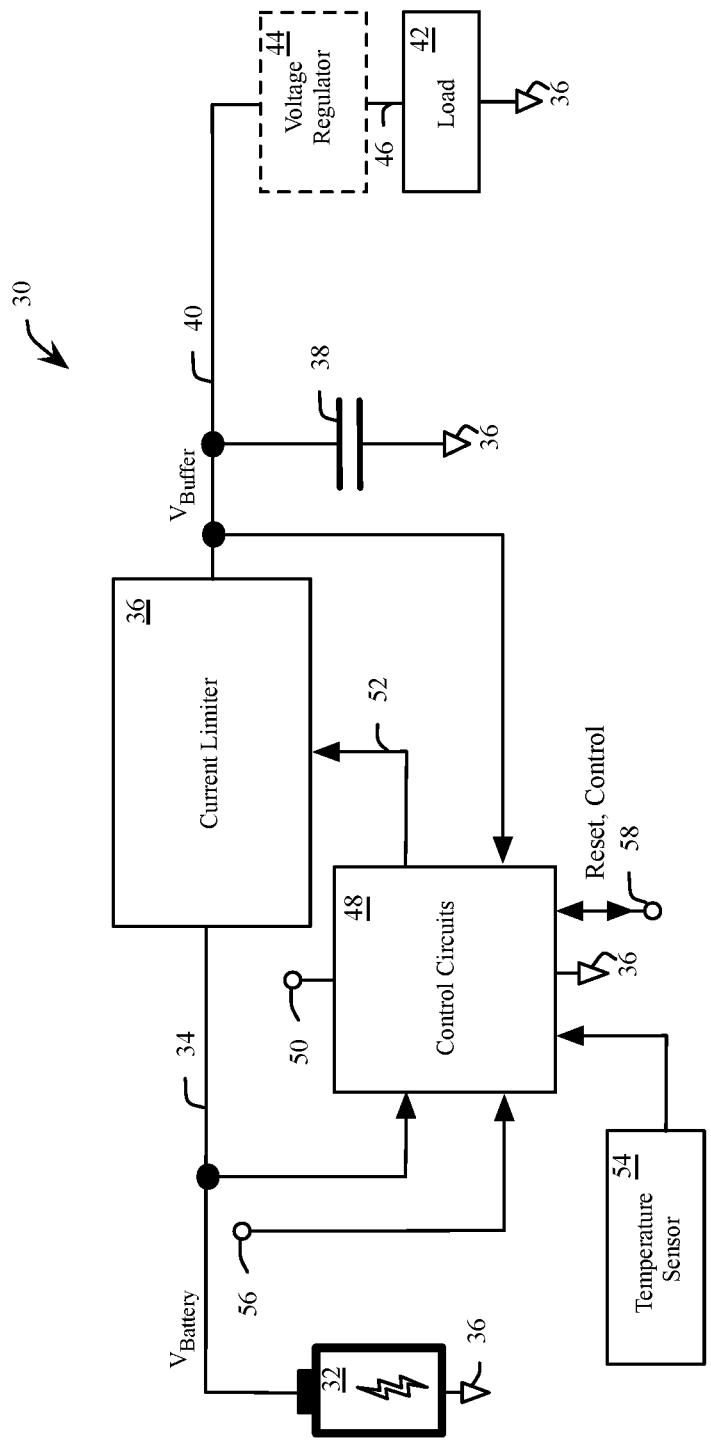
FIG. 3 is a schematic view of a system for power management of applications having duty-cycled high peak supply currents, in accordance with an example embodiment of the present disclosure.

FIG. 3 shows a power management system for applications having duty-cycled high peak supply currents, in accordance with an example embodiment 30 of the present disclosure. Examples of duty-cycled high peak supply current systems include without limitation, an Ultra Wideband (UWB) ranging system, an automotive keyless remote Frequency Operated Button (FOB), Internet of Things devices and applications powered by batteries with minimal capacity. The embodiment 30 includes a battery 32, supplying a battery voltage 34 referenced to a ground 36. A current limiter 36 charges a buffer capacitor 38 to the buffer voltage 40. In one embodiment, the buffer capacitor 38 supplies a load 42, such as a circuit block having an occasional or periodic requirement for high peak supply currents. In another embodiment, the load 42 is both supplied by the buffer capacitor 38 and the current limiter 36.

The current limiter 36 ensures that the current flowing from the battery 32 is maintained substantially at or below a maximum current limit. In one embodiment, the buffer capacitor 38 supplies the peak or pulsed current to the load 42 that exceeds the battery 32 current limited by the current limiter 36. The buffer capacitor 38 is dimensioned such that it can deliver the supply current during the time window that the connected load 42 is activated, while the voltage at the buffer capacitor 38 will not drop below a certain minimum level that is required for proper operation of the connected load 42.

In one embodiment, a voltage regulator 44 regulates the buffer voltage 40 to a regulated voltage 46. Preferably, the voltage regulator is a resonant or switched regulator based on inductive or capacitive elements, rather than a linear regulator thus minimizing further current drain on the buffer capacitor. In one embodiment, the voltage regulator 44 is a boost regulator to allow a bigger voltage drop (e.g., voltage droop) on the buffer capacitor, thereby allowing for a smaller buffer capacitor 38 to be used.

The embodiment 30 includes control circuits 48, powered by a supply 50 and providing a control signal 52 to control the current limiter 36. In one embodiment, the supply 50 is supplied from the battery 32 to guarantee functionality of the control circuits 48 with a discharged buffer capacitor 38. In example embodiments, the charging current output by the current limiter 36, the final charge voltage of the buffer voltage 40 or regulated voltage 46, and the general timing of functions of the current limiter 36 is programmable as a function of various sensor inputs (e.g., battery 32 temperature, and/or state-of-charge), to optimize design trade-offs between minimum application costs, maximum battery life, minimum charging or recharging time of the buffer capacitor 38 and recovery time of the battery 32. Specifically, in the example embodiment 30, the control circuits 48 include a temperature sensor 54 to sense a temperature of the battery 32, a current sensor input 56 indicating a current delivered by the battery 32, the battery voltage 34 and buffer voltage 40 input to the control circuit 48 to measure voltage drop across the current limiter 36, and a reset and control signal 58 for additional external control of the control circuits 48.

In one embodiment of the power management system of FIG. 3, the current limit of the current limiter 36 is programmable. A programmable current limiter 36 is useful for optimizing the power management system for different applications having different battery types or sizes or different peak-current capabilities. Furthermore, the programmable current limiter 36 allows for setting the maximum battery 32 current as a function of temperature.

In one embodiment of the power management system of FIG. 3, the current limiter 36 is programmable to an off (or open) state having low leakage between the battery 32 and the buffer capacitor 38. During a sleep-mode of the load 42, a programmable off state prevents draining the battery 32 due to leakage current of the load and/or buffer capacitor 38. In one embodiment, a leakier, and therefore cheaper buffer capacitor 38, is used by switching the current limiter 36 to an off state when the load 42 is in a sleep-mode. Consequently, the buffer capacitor 38 discharges during the off state of the current limiter 36 and thus requires recharging before the load 42 is reactivated. In this mode, the battery voltage 34 will exceed the buffer voltage 40.

In another embodiment, a low-current load is supplied directly from the battery 32 without discharging the buffer capacitor 38, and thus the battery voltage 34 is less than the buffer voltage 40. For example, in a Key FOB application, a low-current Low Frequency (LF) and Ultra High Frequency (UHF) integrated circuit (IC) is directly supplied by the battery 32, while a high-current UWB IC is supplied by the buffer capacitor 38. The LF and UHF IC will cause the battery voltage 34 to drop because of an output impedance of the battery 32, thus causing a reversal of voltage polarity across the current limiter 36.

In one embodiment of the power management system of FIG. 3, the current limiter 36 includes a low-power bypass mode. Once the buffer capacitor 38 is charged while the load 42 is in sleep-mode, the current limiter 36 need only supply sufficient current to compensate for leakage of the buffer capacitor 38 and any leaky circuits connected thereto. The leakage current associated with the buffer capacitor 38 and connected circuits is typically much less than a current limit of the current limiter 36 (e.g., 10 mA for a typical lithium coin cell battery). In one embodiment, the bias circuits that are required by the current limiter 36 for accurate current limiting are disabled, and the current limiter 36 is placed in a conductive bypass state. In one embodiment, the series impedance of this conductive bypass state is not critical, as long as sufficient current is supplied to the buffer capacitor 38 to minimize voltage drop of the buffer voltage 40. In another embodiment, where the bypass state is also used as a test path under test conditions, with higher peak currents, it is desirable that the bypass state have a lower impedance. The low-power bypass mode is advantageous when the buffer capacitor 38 needs to remain charged during the sleep mode of the load 42 and to minimize draining the battery 32 due to bias currents required in the current limiter 36. In one embodiment, after the load 42 enters the sleep mode, when the buffer capacitor is sufficiently charged, the current limiter 36 is latched into the bypass mode, and subsequently unlatched prior to reactivating the load 42.

In one embodiment of the power management system of FIG. 3, the current limiter 36 includes a voltage limiter mode. This mode is useful for maintaining a charge on the buffer capacitor 38 with reduced buffer capacitor 38 leakage, while the load 42 is in the sleep mode. In one embodiment, the voltage limiter mode includes monitoring the buffer voltage 40 and charging the buffer capacitor 38 to at least a threshold voltage. In one embodiment, the threshold voltage is programmable. Once the buffer voltage 40 reaches the threshold voltage, the current limiter 36 operates as a voltage limiter by only compensating for the leakage current of the load 42 and the buffer capacitor 38. Leakage typically increases with applied voltage, hence the voltage limiter mode will reduce the leakage current of the buffer capacitor 38 and load 42, thereby optimizing the effective battery life of the battery 32. In one embodiment, the leakage current reduction exceeds the extra current consumed by the implementation of the voltage limiter mode. Accordingly, the voltage limiter mode is only enabled when the battery voltage 34 exceeds a certain threshold and/or temperature. The voltage limiter mode enables usage of cheaper capacitors with higher corresponding leakage.

In one embodiment of the power management system of FIG. 3, the current limiter 36 includes a buck mode and a boost mode. In one embodiment, the boost mode charges the buffer capacitor 38 to a buffer voltage 40 exceeding the battery voltage 34. By increasing the buffer voltage 40 beyond what is required for the load 42, additional voltage-droop of the buffer voltage 40 is permitted when the load 42 is activated, thus permitting a smaller buffer capacitor 38 size. In one embodiment, the boosted buffer voltage 40 is reduced with the voltage regulator 44 of FIG. 3 (e.g., operating as a buck regulator). In another embodiment, the current limiter buck mode charges the buffer capacitor 38 when the buffer voltage 40 is less than the battery voltage 34. Accordingly, the current limiter power efficiency and output current is maximized. Both the buck mode and the boost mode are beneficial when the buffer capacitor 38 is allowed to float by putting the current limiter 36 in the off mode, while the load 42 is in the sleep mode. The buffer capacitor 38 is subsequently recharged prior to the load 42 becoming active. In one embodiment, the buck mode and boost mode are implemented in the current limiter 36 with a resonant or switched mode converter. In one embodiment, the buck mode and boost mode use the same shared capacitors and/or inductors. In one embodiment, where excessive Radio Frequency Interference (RFI) issues are present, the buck or boost converter is disabled during the active state of the load 42, thus necessitating a larger buffer capacitor 38.

Figure 4:
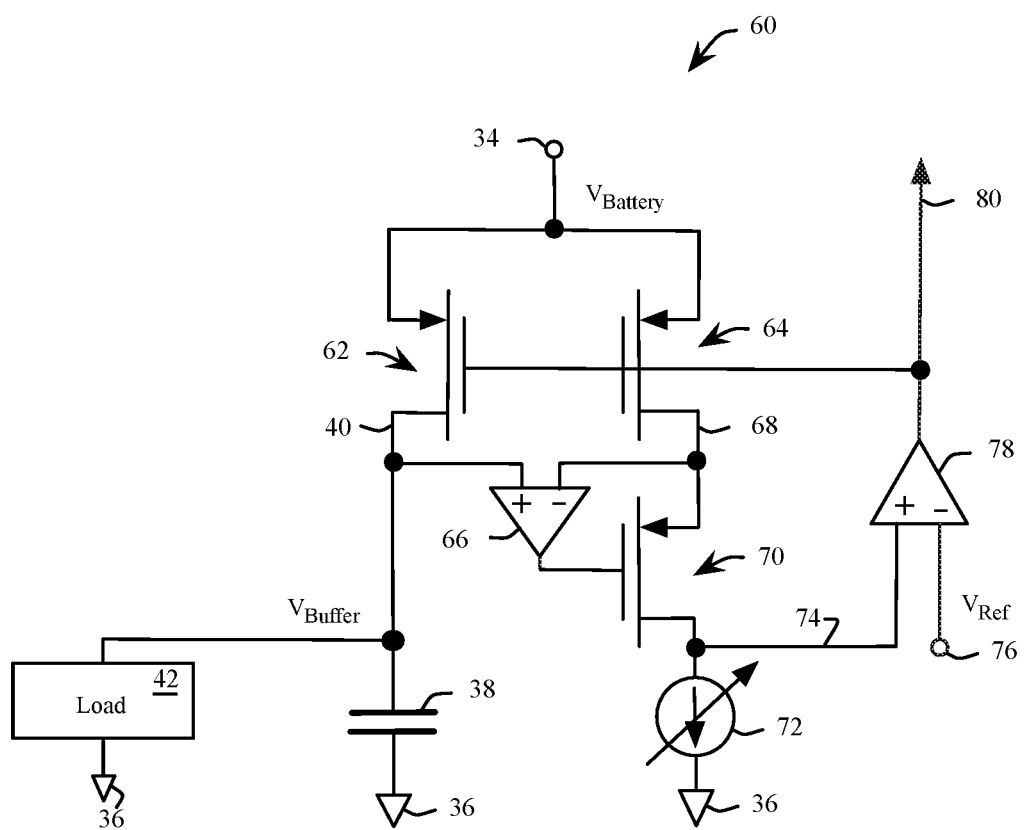
FIG. 4 is a schematic view of the controllable current limiter of FIG. 3, in accordance with an example embodiment of the present disclosure.

FIG. 4 shows an example embodiment 60 of the current limiter 36 of FIG. 3. A current mirror is formed with P-type Field Effect Transistors (PFETs) 62 and 64 with source terminals connected to the battery voltage 34 and drain terminals connected between the buffer voltage 40 and node 68 respectively. A first amplifier 66 compares the buffer voltage 40 to the node 68 to drive a gate of a PFET 70 connected between the node 68 and a controllable current source 72. The first amplifier 66 forces a same voltage between the drains of the PFETs 62 and 64, resulting in a well-matched drain current through PFETs 62 and 64. A second amplifier 78 compares a node 74, joining a drain of the PFET 70 to the controllable current source 72, with a reference voltage 76 to provide a gate voltage 80. The gate voltage 80 forces the drain current of the PFETs 62 and 64 to be equal to a current sunk by the controllable current source 72.

In another embodiment, the current sunk by the controllable current source 72 is reduced (for a given current limit), by increasing the gain or a channel width of the PFET 62 relative to a channel width relative to the PFET 64. In one embodiment, the current limiter 60 is programmed by changing a sunk current of the controllable current source 72. In another embodiment, the current limiter 60 is programmed by changing the relative gain or channel widths of the PFETs 62 and 64 through mask options, fuse links and the like. In one embodiment of current limiter 60 implementing the programmable off state, the gate voltage 80 is forced to the battery voltage 34 when the battery voltage 34 exceeds the buffer voltage 40, or is forced to the buffer voltage 40 when the battery voltage 34 is less than the buffer voltage 40. In one embodiment of current limiter 60 implementing the low-power bypass mode, the gate voltage 80 is forced to ground, thereby connecting the battery 32 and the buffer capacitor 38 through a low impedance. In another embodiment, an additional switch is added between the battery 32 and the buffer capacitor 38 to bypass the current limiter 60, when the current limiter 60 is disabled. Disabling the bias circuits in the current limiter 60 minimizes power consumption. For example, bias circuits in the embodiment 60 include at least the controllable current source 72 and internal bias circuits (not shown) in the first amplifier 66 and the second amplifier 78. In one embodiment, a decision to activate the bypass mode is made by monitoring a voltage difference between the battery voltage 34 and the buffer voltage 40. In another embodiment, a decision to activate the bypass mode is made by monitoring the saturation of the controllable current source 72 as indicated by the gate voltage 80 being close to ground 36. Accordingly, this indicates that the PFET 62 is out of saturation and that the buffer capacitor 38 is charged. Subsequently, the current limiter 60 is latched into the bypass state and bias circuits of the current limiter 60 are disabled.

Figure 5:
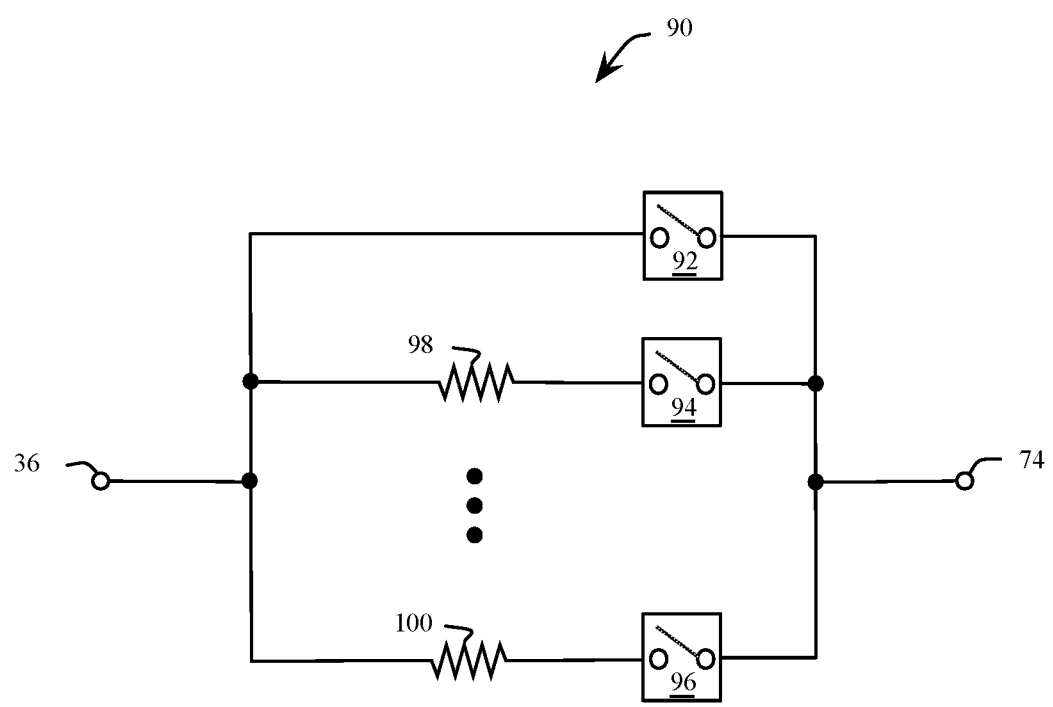
FIG. 5 is a schematic view of the controllable current source of FIG. 4, in accordance with an example embodiment of the present disclosure.

FIG. 5 shows an example embodiment 90 of the controllable current source 72 of FIG. 4. The embodiment controls a current sunk from the node 74 to the ground 36. In the embodiment 90, the node 74 is monitored with respect to the ground 36 for selecting a combination of the switches 92, 94 and 96 to approximate a desired current source value. Activation of the switches 94 and 96 connect respective resistors 98 and 100 in parallel to each other and between the node 74 and the ground 36.

The off-mode is realized by disabling all of the switches 92, 94 and 96. A low power mode is realized by closing one or more of the switches 92, 94 and 96 and further disabling all monitoring circuits. It should be appreciated that other embodiments of the controllable current source 90 have a different number of switches from what is depicted in the example embodiment 90 of FIG. 5.

Figure 6:
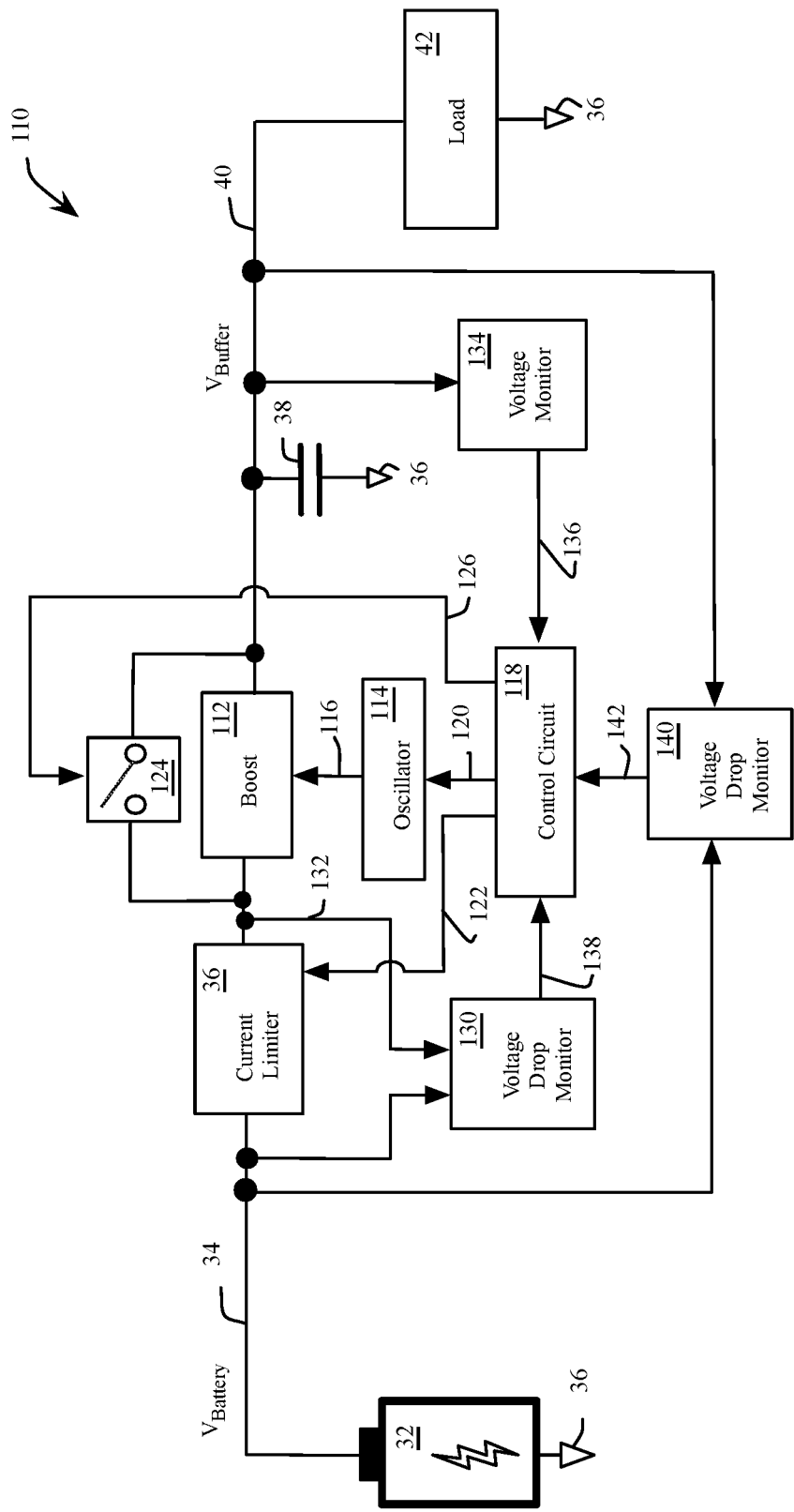
FIG. 6 is a schematic view of a system for power management of applications having duty-cycled high peak supply currents, in accordance with an example embodiment of the present disclosure.

FIG. 6 shows an example embodiment 110 of a power management system for applications having duty-cycled high peak supply currents, including a boost-mode converter 112 in series with the current limiter 36. In one example embodiment, the boost-mode converter 112 is implemented with a charge pump. In another example embodiment, the boost-mode converter 112 is implemented with a capacitive voltage doubler. The boost-mode converter 112 is controlled by an oscillator 114 through an oscillator output 116. A control circuit 118 controls the oscillator with control signal 120. The control circuit 118 controls the current limiter 36 with a control signal 122 and a bypass switch 124 across the boost-mode converter 112 with a control signal 126. A voltage drop monitor 130 measures a voltage drop between the battery voltage 34 and a node 132, thereby measuring a voltage drop across the current limiter 36. A voltage monitor 134 measures the buffer voltage 40 and provides a measured voltage signal 136 to the control circuit 118. The voltage drop monitor 130 provides a voltage drop signal 138 to the control circuit 118. A voltage drop monitor 140 measures a voltage difference between the battery voltage 34 and the buffer voltage 40 and provides a voltage difference signal 142 to the control circuit 118.

When the buffer voltage 40 is less than the battery voltage 34, as sensed by the voltage drop monitor 140, then only the current limiter 36 is used, and the boost-mode converter 112 is bypassed by closing the switch 124 and disabled. When the voltage difference between the buffer voltage 40 and the battery voltage 34 is small or the input current to the current limiter 36 is half of a programmed current limit of the current limiter 36, then the boost-mode converter 112 is enabled and the bypass switch 124 opened. In another embodiment, the voltage drop across the current limiter 36, as measured by the voltage drop monitor 130, is used to control the effective switching frequency of the boost-mode converter 112 to optimize converter efficiency. In one embodiment, when the buffer voltage 40 reaches a programmed voltage threshold, as sensed by the voltage monitor 134, the boost-mode converter 112 is disabled or paused.

Figure 7:
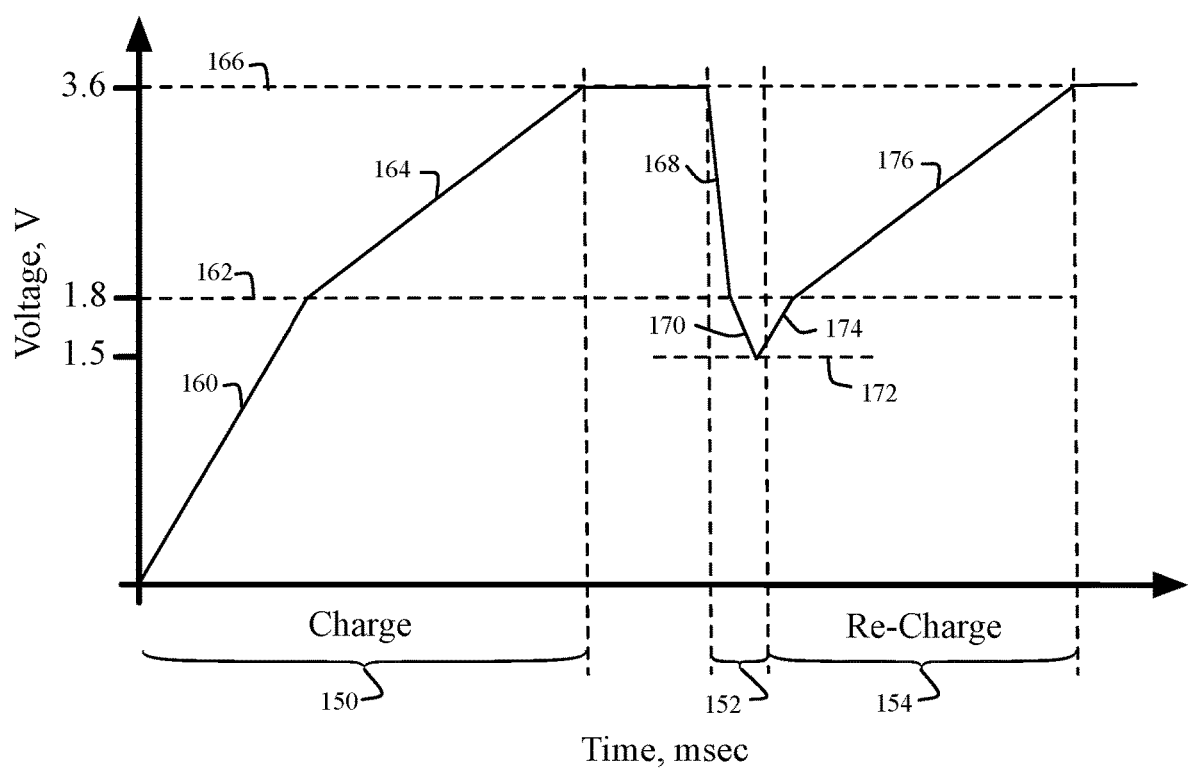
FIG. 7 is a graphical view of an embodiment of a charging characteristic of the buffer capacitor of FIG. 6 with subsequent loading.

FIG. 7 with continued reference to FIG. 6 shows a charging characteristic of the buffer capacitor 38 during a charge phase 150, with subsequent loading of the buffer capacitor 38 by the load 42 during an active phase 152 of the load 42 and a recharging phase 154 of the buffer capacitor 38. In FIG. 7, the buffer capacitor 38 starts with no charge and ramps to a voltage 162 of 1.8V while the current limiter 36 acts as a current source during a period 160. In one embodiment, at the voltage 162, the input current to the current limiter 36 is 50% of a current limit of the current limiter 36. During a period 164, the boost mode converter 112 is enabled until the maximum voltage 166 of 3.6V reached.

When the load is activated during the active phase 152, the buffer voltage 40 drops during the period 168 down to the voltage 162 as it supplies current to the load 42. The amount of reduction in the buffer voltage 40 depends in part on the load current and size of the buffer capacitor 38. When the buffer voltage 40 drops below the voltage 162, corresponding to the input current to the current limiter 36 being 50% of the current limit of the current limiter 36, the boost mode converter 112 is disabled again. Consequently, the continued reduction in buffer voltage 40 occurs at a slow rate during the period 170. In one embodiment, the current limit is programmed to ensure that the buffer voltage 40 does not drop below the voltage 172 of 1.5V, required for proper operation of the load 42. After the load 42 reenters the sleep-mode the buffer capacitor 38 is recharged during periods 174 and 176, with the same operation performed during periods 160 and 164. In one embodiment, the boost mode converter 112 is disabled during the 168 period to reduce RFI issues when the load 42 is active.

Figure 8:
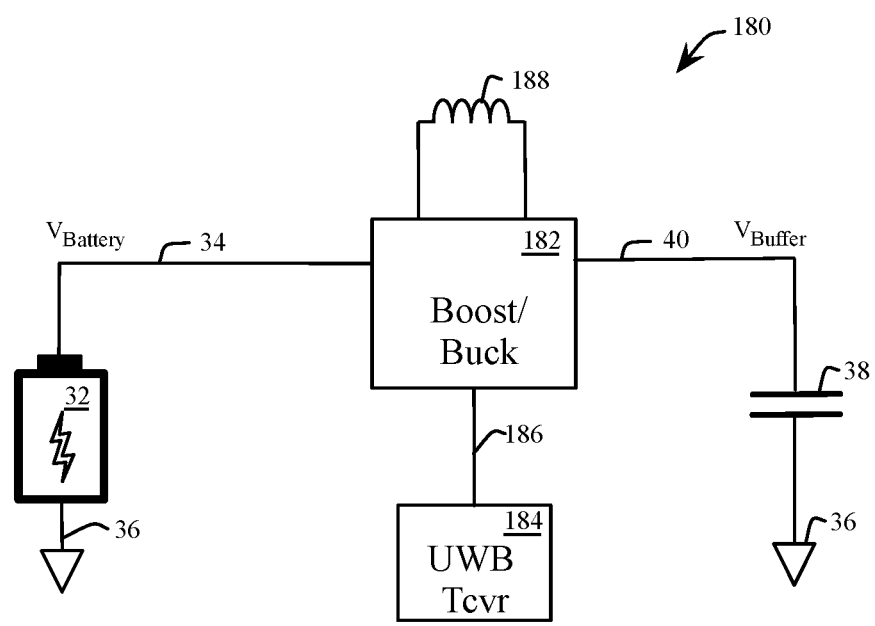
FIG. 8 is a schematic view of a system for power management of applications having duty-cycled high peak supply currents, in accordance with an example embodiment of the present disclosure.

FIG. 8 shows an example embodiment 180 of a power management system for applications having duty-cycled high peak supply currents, including a reconfigurable boost and buck mode converter 182 for charging the buffer capacitor 38 and supplying the load 184. A buck converter is used for charging the buffer capacitor 38 when the buffer voltage 40 is less than the battery voltage 34, and a boost converter is used for charging the buffer capacitor 38 when the buffer voltage 40 is above the battery voltage 34. A buck converter is used to supply a load 184 with a voltage that is lower than the buffer voltage 40, and a boost converter is used to supply the load 184 with a voltage higher than the buffer voltage 40, wherein the buck converter and the boost converter share an inductor 188. For example, in the embodiment 180, the boost and buck mode converter 182 supplies power to a UWB transceiver 184 over a path 186. In the embodiment 180, the boost mode is used for charging the buffer capacitor 38 above the battery voltage 34, hence permitting more voltage droop and/or a smaller buffer capacitor 38. Subsequently, the buck mode receives the boosted buffer voltage 40 as an input, and provides a voltage to the UWB transceiver 184, which is bucked down from the buffer voltage 40. This buck-charge operation provides for better efficiency and higher charging current to the load 184. In another embodiment, the converter 182 bucks the battery voltage 34 down to a lower buffer voltage 40, then the converter 182 receives and boosts the buffer voltage 40 up to a higher load voltage to supply the load 184.

With reference to FIG. 7 and FIG. 8, in another embodiment, during the charge phase 150 the converter 182 bucks the buffer voltage 40 up to the voltage 162 (also corresponding to the battery voltage 34) during the period 160 and boosts the buffer voltage 40 up to the voltage 166 during the period 164. During the active or discharge phase 152, the converter 182 bucks the buffer voltage 40 down to the voltage 162 (also corresponding to the battery voltage 34) during the period 168 and boosts the buffer voltage 40 during the period 170.

Figure 9:
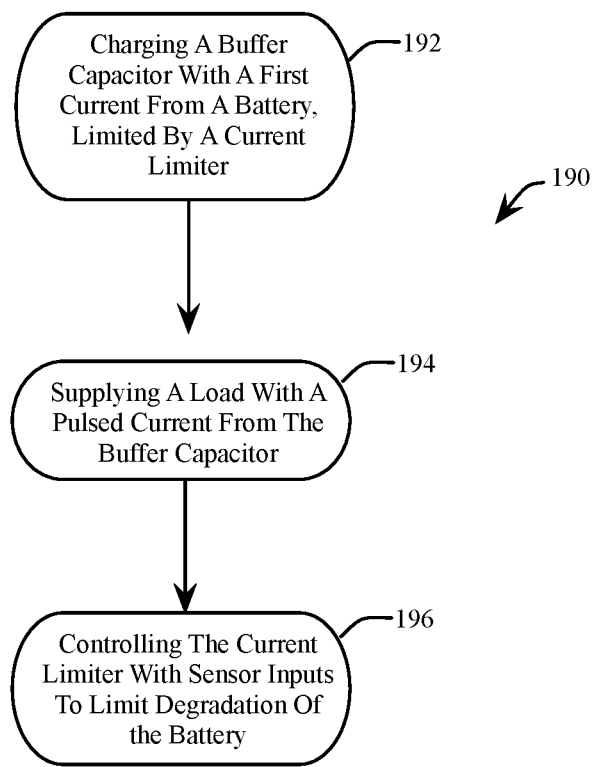
FIG. 9 is a flowchart representation of a method for power management for applications having duty-cycled high peak supply currents, in accordance with an example embodiment of the present disclosure.

FIG. 9 with reference to FIG. 3 shows a method 190 for power management for applications having duty-cycled high peak supply currents. At 192, a buffer capacitor 38 is charged with a current from a battery 32, limited by a current limiter 36. At 194, a load 42 is supplied with a pulsed current from the buffer capacitor 38. At 196, the current limiter 36 is controlled with sensor inputs 34, 40, 56 and 54 to limit a degradation of the battery 32 including at least one of a capacity and a lifetime of the battery 32.

Figure 10:
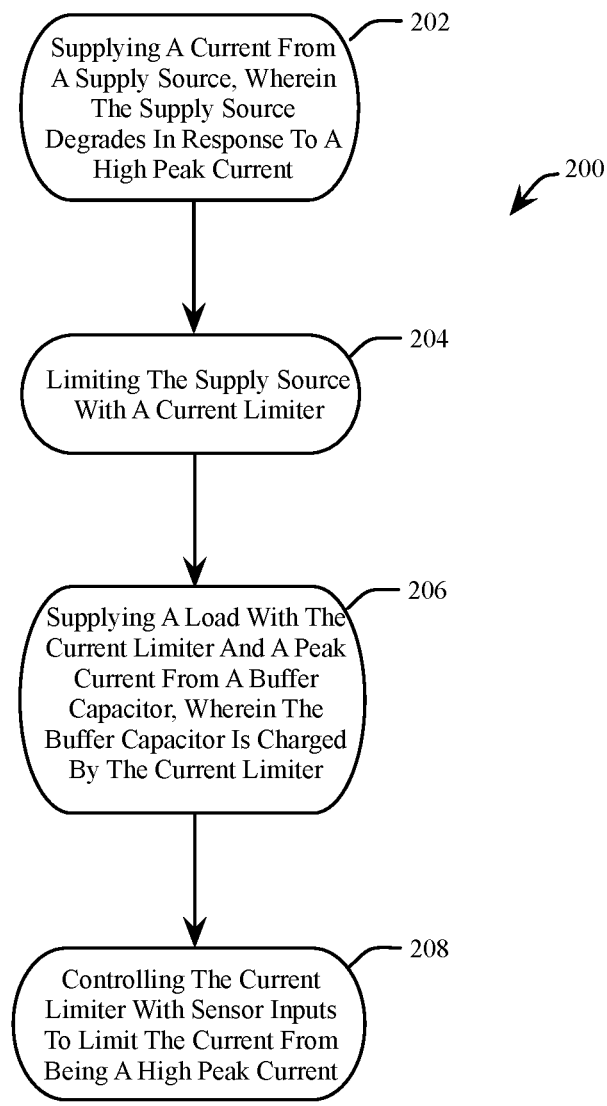
FIG. 10 is a flowchart representation of a method for power management for applications having duty-cycled high peak supply currents, in accordance with an example embodiment of the present disclosure.

FIG. 10 with reference to FIG. 3 shows a method 200 for power management for applications having duty-cycled high peak supply currents. At 202, a current is supplied from a supply source (e.g., a battery 32), which will be damaged when it has to deliver high peak currents. At 204, the current from the supply source is limited with a current limiter 36. At 206, an activated load 42 is supplied with a current from the current limiter 36 and a peak current from the buffer capacitor 38, wherein the buffer capacitor 38 is charged by the current limiter 36. At 208, the current limiter 36 is controlled with sensor inputs 34, 40, 56 and 54 to limit the current from being a high peak current, thereby limiting degradation of the supply source.

As will be appreciated, embodiments as disclosed include at least the following. In one embodiment, a method for power management for applications having duty-cycled high peak supply currents comprises charging a buffer capacitor with a first current supplied by a battery, wherein the first current is limited by a current limiter. A load is supplied with a second current supplied by the buffer capacitor, wherein the second current comprises a pulsed current. The current limiter is controlled with at least one of a plurality of sensor inputs to limit a capacity degradation of the battery.

Alternative embodiments of the method for power management for applications having duty-cycled high peak supply currents include one of the following features, or any combination thereof. A current limit of the current limiter is determined by a temperature of the battery. The buffer capacitor is disconnected from the load in response to the load entering a sleep mode, and recharging the buffer capacitor prior to reconnected the buffer capacitor to the load in response to the load exiting the sleep mode. The buffer capacitor is charged to a buffer voltage being less than a battery voltage of the battery, by reducing a voltage output of the current limiter with a buck converter, thereby maximizing one or more of an output current of the current limiter and a power efficiency of the current limiter. The buffer capacitor is charged to a buffer voltage being greater than a battery voltage of the battery, by increasing a voltage output of the current limiter with a boost converter, thereby increasing a permissible voltage droop of the buffer capacitor. The current limiter is latched into a conductive bypass mode and a bias circuit of the current limiter is disabled, in response to the load entering a sleep mode and the buffer capacitor being charged above a threshold voltage, wherein the threshold voltage is greater than a minimum voltage. The buffer capacitor is charged to at least a threshold voltage in response to the load entering a sleep mode, wherein the threshold voltage is programmed to reduce a leakage of the buffer capacitor as a function of temperature, and the current limiter operates as a voltage limiter when a voltage of the buffer capacitor exceeds the threshold voltage. The buffer capacitor is charged to a buffer voltage being higher than a battery voltage, by boosting a voltage output of the current limiter with a boost converter, and reducing the buffer voltage with a buck converter to supply a load voltage to the load, wherein the buck converter and the boost converter share an inductor. An output voltage of the current limiter is doubled with a voltage doubler in response to the first current being less than half of a limit current of the current limiter. A switching frequency of the voltage doubler is controlled with a voltage drop across the current limiter.

In another embodiment, an apparatus comprises a battery configured to supply a first current, wherein the first current is at or below a threshold current. A buffer capacitor is configured for one or more of being charged by the first current and supplying a second current to a load, wherein the second current comprises a pulsed current. A current limiter is interposed between the battery and the buffer capacitor, wherein the current limiter limits the first current and the buffer capacitor supplies a pulsed load current to the load. A plurality of sensors is configured to control the current limiter.

Alternative embodiments of the apparatus include one of the following features, or any combination thereof. The plurality of sensors comprises a temperature sensor configured to determine a current limit of the current limiter based on a temperature of the battery. A switch is configured to disconnect the buffer capacitor from the load in response to the load entering a sleep mode, and the current limiter is configured to recharge the buffer capacitor prior to reconnecting the buffer capacitor to the load with the switch in response to the load exiting the sleep mode. A buck converter is interposed between the current limiter and the buffer capacitor, wherein the buck converter is configured to charge the buffer capacitor when the buffer voltage is lower than the battery voltage, thereby maximizing one or more of an output current of the current limiter and a power efficiency of the current limiter. A boost converter is interposed between the current limiter and the buffer capacitor, wherein the boost converter is configured to charge the buffer capacitor to a buffer voltage being greater than a battery voltage of the battery, thereby increasing a permissible voltage droop of the buffer capacitor. The current limiter comprises a conductive bypass mode configured to connect the battery to the buffer capacitor through a low impedance path in response to the load entering a sleep mode and the buffer capacitor being charged above a threshold voltage. A voltage doubler is interposed between the current limiter and the buffer capacitor, wherein the voltage doubler is configured to double an output voltage of the current limiter in response to the first current being less than half of a limit current of the current limiter.

In another embodiment, a method for power management for applications having duty-cycled high peak supply currents comprises supply a current with a supply source, wherein one or more of a lifetime and a current capacity of the supply source is degraded in response to the current being a high peak current. The current of the supply source is limited with a current limiter. The current limiter is controlled with at least one of a plurality of sensor inputs to limit the current from being the high peak current.

Alternative embodiments of the method for power management for applications having duty-cycled high peak supply currents include one of the following features, or any combination thereof. The current limiter is latched into a conductive bypass mode and a bias circuit of the current limiter is disabled, in response to the load entering a sleep mode and the buffer capacitor being charged above a threshold voltage, wherein the threshold voltage is greater than a minimum voltage. An output voltage of the current limiter is doubled with a voltage doubler in response to the continuous current being less than half of a limit current of the current limiter.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for power management for applications having duty-cycled high peak supply currents comprising:
charging a buffer capacitor with a first current supplied by a battery, wherein the first current is limited by a current limiter;
supplying a load with a second current supplied by the buffer capacitor, wherein the second current comprises a pulsed current; and
controlling the current limiter with at least one of a plurality of sensor inputs to limit a capacity degradation of the battery, wherein the current limiter is latched into a conductive bypass mode and a bias circuit of the current limiter is disabled, in response to the load entering a sleep mode and the buffer capacitor being charged above a threshold voltage, wherein the threshold voltage is greater than a minimum voltage.

2. The method of claim 1 wherein a current limit of the current limiter is determined by a temperature of the battery.

3. The method of claim 1 further comprising disconnecting the buffer capacitor from the load in response to the load entering a sleep mode, and recharging the buffer capacitor prior to reconnected the buffer capacitor to the load in response to the load exiting the sleep mode.

4. The method of claim 3 further comprising charging the buffer capacitor to a buffer voltage being less than a battery voltage of the battery, by reducing a voltage output of the current limiter with a buck converter, thereby maximizing one or more of an output current of the current limiter and a power efficiency of the current limiter.

5. The method of claim 3 further comprising charging the buffer capacitor to a buffer voltage being greater than a battery voltage of the battery, by increasing a voltage output of the current limiter with a boost converter, thereby increasing a permissible voltage droop of the buffer capacitor.

6. The method of claim 1 further comprising charging the buffer capacitor to at least a threshold voltage in response to the load entering a sleep mode, wherein the threshold voltage is programmed to reduce a leakage of the buffer capacitor as a function of temperature, and the current limiter operates as a voltage limiter when a voltage of the buffer capacitor exceeds the threshold voltage.

7. The method of claim 1 further comprising charging the buffer capacitor to a buffer voltage being higher than a battery voltage, by boosting a voltage output of the current limiter with a boost converter, and reducing the buffer voltage with a buck converter to supply a load voltage to the load, wherein the buck converter and the boost converter share an inductor.

8. The method of claim 1 further comprising doubling an output voltage of the current limiter with a voltage doubler in response to the first current being less than half of a limit current of the current limiter.

9. The method of claim 8 further comprising controlling a switching frequency of the voltage doubler with a voltage drop across the current limiter.

10. An apparatus comprising:
a battery configured to supply a first current, wherein the first current is at or below a threshold current;

a buffer capacitor configured for one or more of being charged by the first current and supplying a second current to a load, wherein the second current comprises a pulsed current;

a current limiter interposed between the battery and the buffer capacitor, wherein the current limiter limits the first current and the buffer capacitor supplies a pulsed load current to the load; and a plurality of sensors configured to control the current limiter, wherein the current limiter comprises a conductive bypass mode configured to connect the battery to the buffer capacitor through a low impedance path in response to the load entering a sleep mode and the buffer capacitor being charged above a threshold voltage.

11. The apparatus of claim 10 the plurality of sensors comprises a temperature sensor configured to determine a current limit of the current limiter based on a temperature of the battery.

12. The apparatus of claim 10 further comprising a switch configured to disconnect the buffer capacitor from the load in response to the load entering a sleep mode, and the current limiter configured to recharge the buffer capacitor prior to reconnecting the buffer capacitor to the load with the switch in response to the load exiting the sleep mode.

13. The apparatus of claim 12 further comprising a buck converter interposed between the current limiter and the buffer capacitor, wherein the buck converter is configured to charge the buffer capacitor when the buffer voltage is lower than the battery voltage, thereby maximizing one or more of an output current of the current limiter and a power efficiency of the current limiter.

14. The apparatus of claim 12 further comprising a boost converter interposed between the current limiter and the buffer capacitor, wherein the boost converter is configured to charge the buffer capacitor to a buffer voltage being greater than a battery voltage of the battery, thereby increasing a permissible voltage droop of the buffer capacitor.

15. The apparatus of claim 10 further comprising a voltage doubler interposed between the current limiter and the buffer capacitor, wherein the voltage doubler is configured to double an output voltage of the current limiter in response to the first current being less than half of a limit current of the current limiter.

16. A method for power management for applications having duty-cycled high peak supply currents comprising:

supplying a current with a supply source, wherein one or more of a lifetime and a current capacity of the supply source is degraded in response to the current being a high peak current;

limiting the current of the supply source with a current limiter;

supplying a load with the current limiter and with a peak current supplied by a buffer capacitor, wherein the buffer capacitor is charged by the current limiter; and controlling the current limiter with at least one of a plurality of sensor inputs to limit the current from being the high peak current, wherein the current limiter is latched into a conductive bypass mode and a bias circuit of the current limiter is disabled, in response to the load entering a sleep mode and the buffer capacitor being charged above a threshold voltage, wherein the threshold voltage is greater than a minimum voltage.

17. The method of claim 16 further comprising doubling an output voltage of the current limiter with a voltage doubler in response to the continuous current being less than half of a limit current of the current limiter.

* * * * *